United States Patent [19]

Klein et al.

[11] E Patent Number: Re. 32,601

[45] Reissued Date of Patent: Feb. 16, 1988

[54] AUTOMATIC VEHICLE WASHER

[75] Inventors: Julian L. Klein; James A. Nelson; Terrence J. Smith, all of Des Moines, Iowa

[73] Assignee: Ryko Manufacturing Company, Grimes, Iowa

[21] Appl. No.: 927,817

[22] Filed: Nov. 6, 1986

Related U.S. Patent Documents

Reissue of:

[64] Patent No.: 4,527,578
Issued: Jul. 9, 1985
Appl. No.: 535,647
Filed: Sep. 26, 1983

[51] Int. Cl.[4] ..... B60S 3/04

[52] U.S. Cl. ..... 134/57 R; 340/825.32; 134/123

[58] Field of Search ..... 134/57 R, 58 R, 123; 340/825.32; 15/DIG. 2

[56] References Cited

U.S. PATENT DOCUMENTS

| | | | |
|---|---|---|---|
| 4,021,796 | 5/1977 | Fawcett, Jr. et al. | 340/825.32 X |
| 4,095,239 | 6/1978 | Gerry | 340/825.32 |
| 4,369,801 | 1/1983 | Jones et al. | 134/58 R |
| 4,438,426 | 3/1984 | Adkins | 340/825.32 X |

*Primary Examiner*—Philip R. Coe
*Attorney, Agent, or Firm*—Allegretti, Newitt, Witcoff & McAndrews, Ltd.

[57] ABSTRACT

Automatic vehicle washer. The washer includes a vehicle washing apparatus, source of electrical power, manual input, code verifier and activator. The manual input allows a driver of a vehicle to transmit a numerical signal to the code verifier. If the code verifier determines that the numerical signal corresponds to a predetermined numerical code, the energizer interconnects the vehicle washing apparatus with the source of electrical power.

8 Claims, 7 Drawing Figures

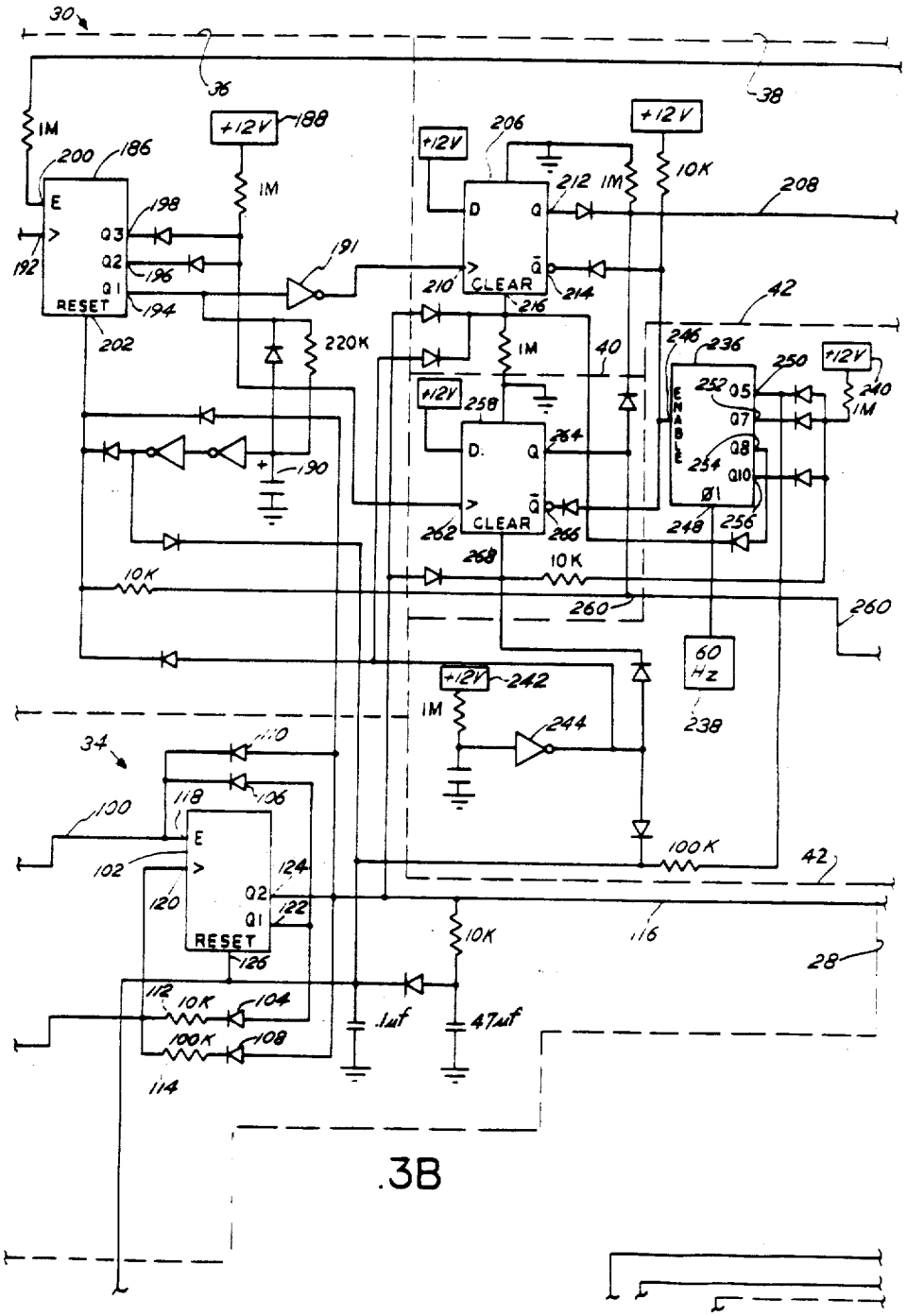
.3B

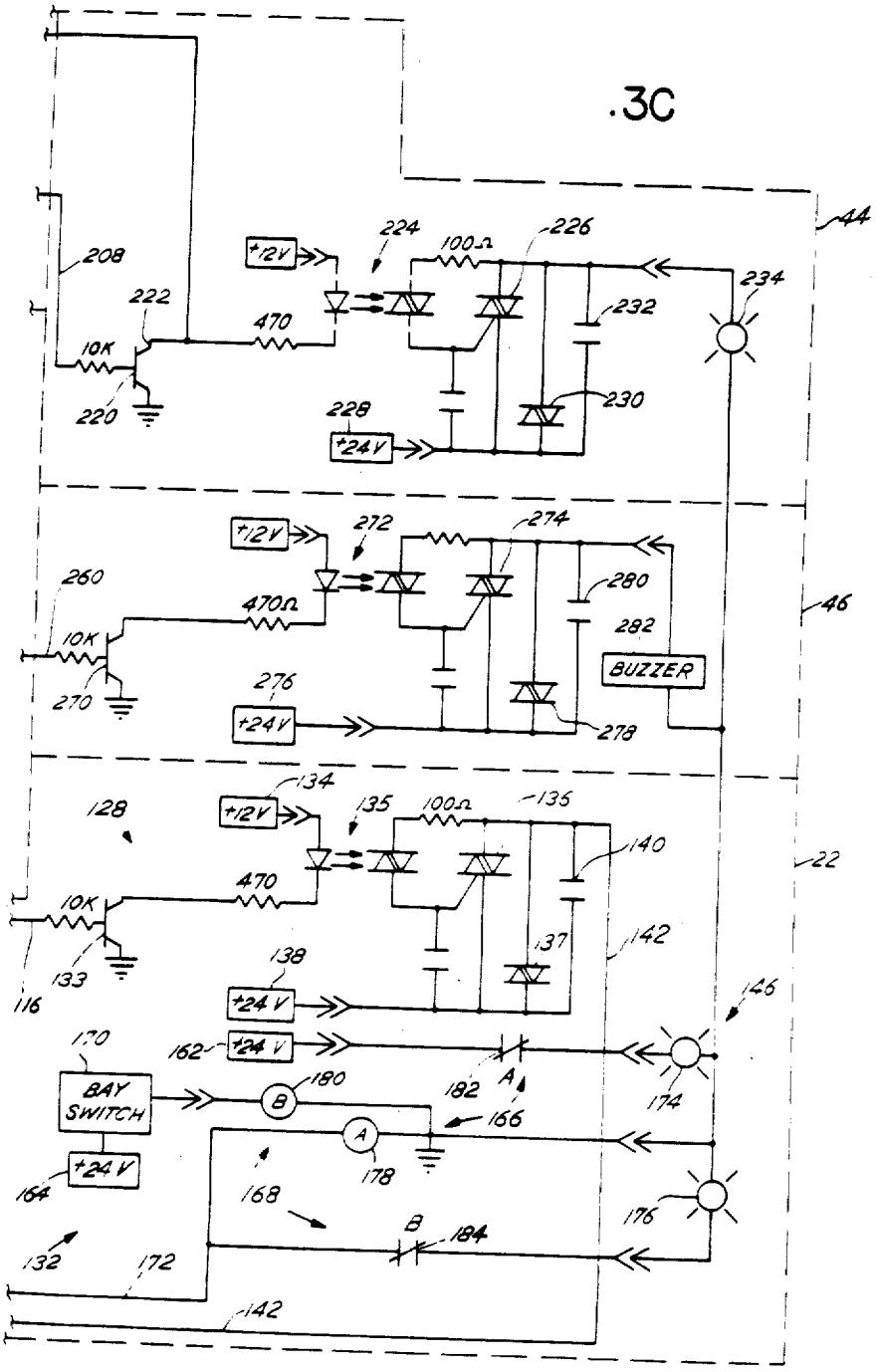
.3C
44
208
222
10K
220
470
+12V
224
100Ω
226
232
234
228
+24V
230
+12V
272
274
260
470Ω
10K
270
280
282
BUZZER
276
+24V
278
46
128
+12V
134
135
100Ω
135
140
470
10K
133
116
138
137
142
+24V
22
146
170
162
+24V
BAY SWITCH
180
182
A
174
166
+24V
164
178
168
176
B
184
132
172
142

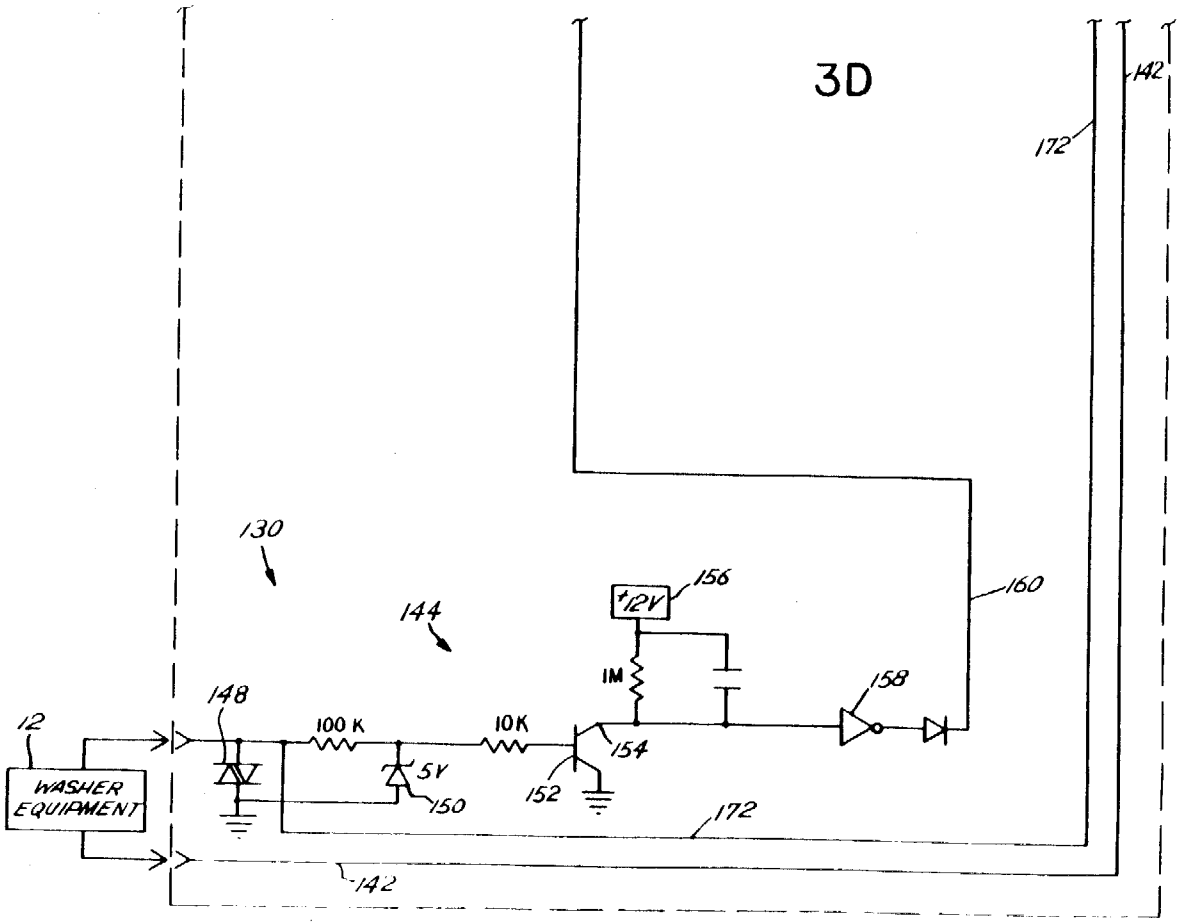
3D
142
172
160
158
156
+12V
1M
154
152
10K
144
5V
150
100 K
130
148
142
172
WASHER EQUIPMENT
12

AUTOMATIC VEHICLE WASHER

Matter enclosed in heavy brackets [ ] appears in the original patent but forms no part of this reissue specification; matter printed in italics indicates the additions made by reissue.

BACKGROUND OF THE INVENTION

The present invention relates generally to an automatic vehicle washer. Typically, an automatic vehicle washing device allows a driver of a vehicle to deposit coins in a coin box and position the vehicle in a predetermined position. If a proper combination of coins has been deposited in the coin box, the washing equipment turns on and cleans the vehicle.

In other instances, a driver may, for example, pay money to the operator of an automatic vehicle washer in order to receive a token. Alternatively, a driver may purchase gasoline or other products at a service station and be given a token by the service station operator. The driver can then deposit the token, rather than coins, in a coin box in order to activate the washing equipment and have his vehicle cleaned.

The presently available systems for activating automatic vehicle washing devices, however, have several drawbacks. For example, the coin box may become full of coins or tokens. Until an operator then empties the coin box, the vehicle washing device will not operate.

In addition, conventional coin boxes frequently become "jammed" with coins or suffer other types of mechanical breakdowns. Until the coin box is repaired, of course, the vehicle washing device remains inoperative.

Also, conventional coin boxes may activate the washing device upon receiving slugs (or other unauthorized objects) rather than coins or tokens distributed by the operator of the automatic vehicle washer. This problem has become increasingly prevalent as more video arcade operators have adopted the practice of selling tokens for use in video games. Such tokens are often indistinguishable from those distributed by operators of automatic vehicle washers. A dishonest driver may purchase tokens from a video arcade for a nominal amount and then deposit one in an automatic vehicle washer coin box. In this way, he may have his vehicle washed without paying the operator of the vehicle washer.

In addition, many drivers receive tokens entitling them to have their vehicle washed, but do not use them in the coin box. The tokens are instead lost or discarded, and the operator of the automatic vehicle washer must consequently purchase new tokens.

SUMMARY OF THE INVENTION

In a principal aspect, the present invention is an automatic vehicle washer. An automatic vehicle washer operator may instruct a driver of a vehicle as to a particular numerical code rather than, for example, giving the driver a token. Accordingly, the driver may manually transmit the code to the vehicle washer (rather than depositing a token or coin in a coin box) in order to have the vehicle washer clean his car.

The washer includes an apparatus that actually washes the vehicle, an electrical power source for the washing apparatus, an input, a comparator, and an energizer.

The input manually receives a numerical input from a driver of a vehicle. In response to the numerical input, the input provides a signal to the comparator.

The comparator is interconnected to the input and receives the signal. In addition, the comparator receives and stores a predetermined numerical code and compares the numerical code to the signal from the input. If they coincide, the comparator produces a run signal.

The energizer is interconnected to the comparator and receives any run signal produced by the comparator. Whenever a run signal is received, indicating that the input has received a proper numerical input, the energizer interconnects the electrical power source with the vehicle washing apparatus.

Thus, an object of the present invention is an improved automatic vehicle washer. An additional object is an improved automatic vehicle washer that is activated upon receiving a predetermined numerical input.

Another object of the present invention is an automatic vehicle washer that is less likely to malfunction because of the mechanical difficulties inherent in machines that receive coins or tokens. Still another object is an automatic vehicle washer that uses fewer mechanical parts and thus is more reliable.

These and other objects of the present invention will be more fully understood by reference to the following detailed description of the preferred embodiment.

BRIEF DESCRIPTION OF THE DRAWING

A preferred embodiment of the present invention is described herein with reference to the drawing wherein.

DETAILED DESCRIPTION OF THE PREFERRED EMBODIMENT

Figure 1:
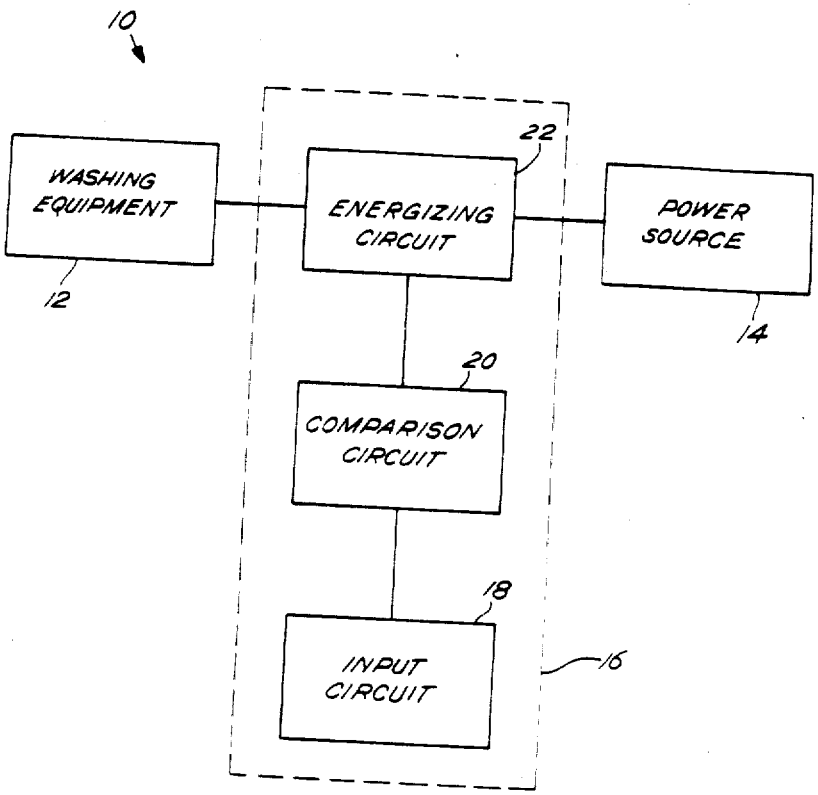
FIG. 1 is a simplified block diagram of a preferred embodiment of the present invention.
Figure 2:
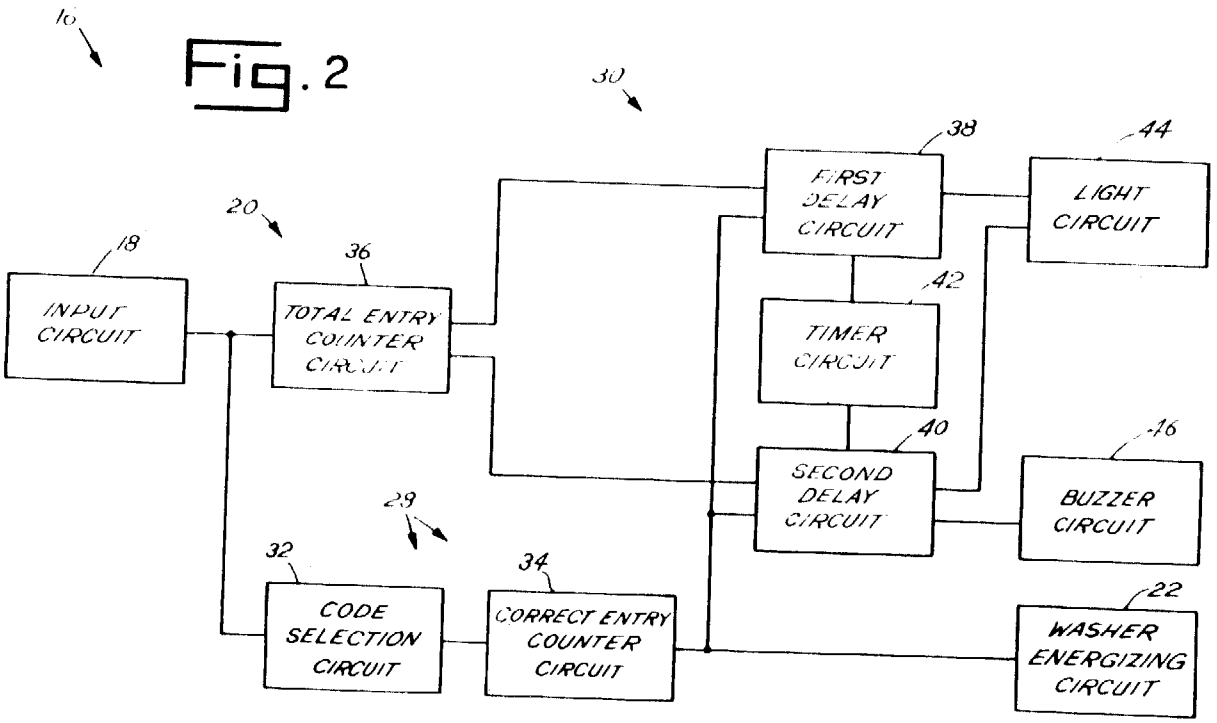
FIG. 2 is a detailed block diagram of the activation circuit of the preferred embodiment shown in FIG. 1.
Figure 3:
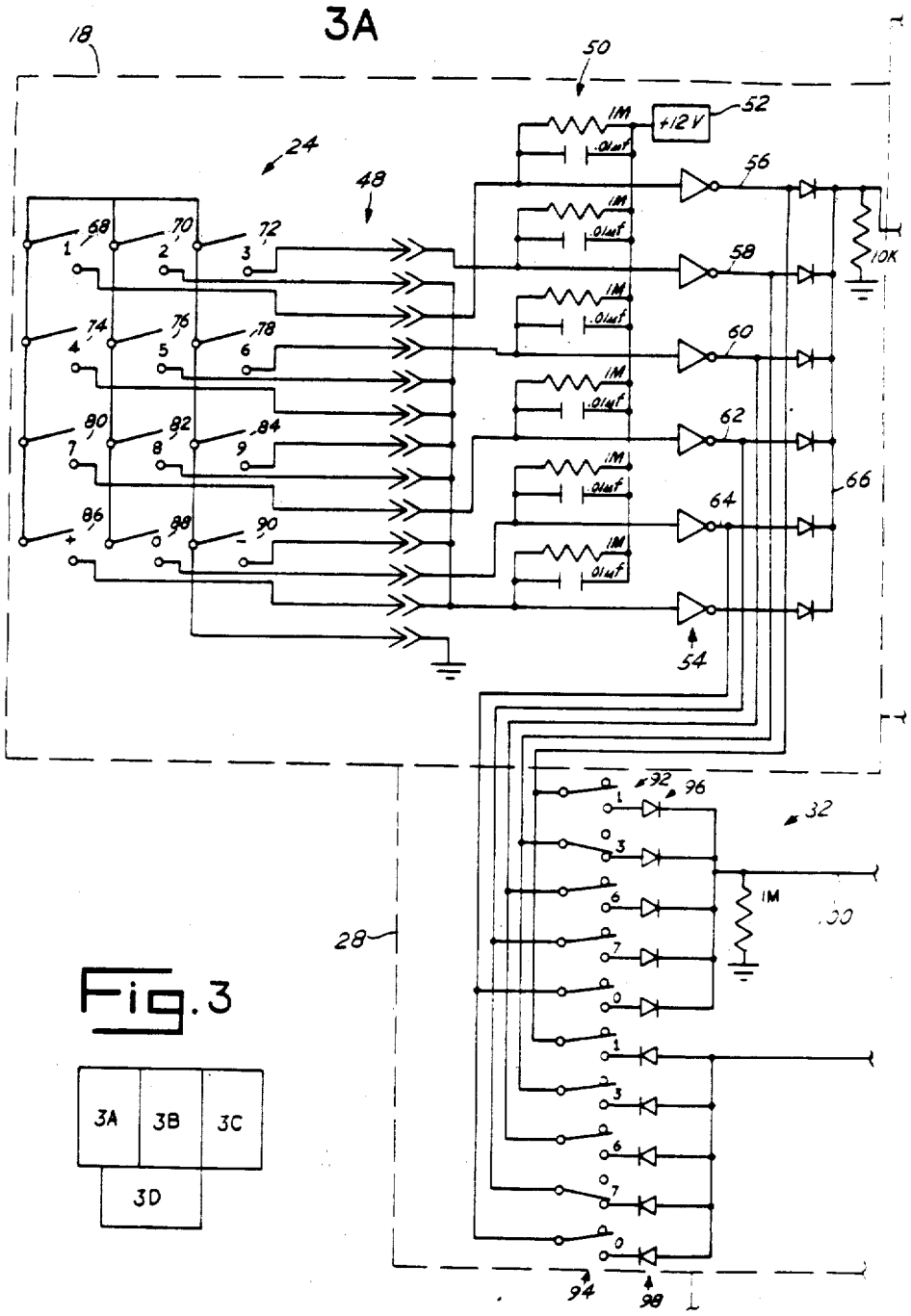
FIG. 3 is a schematic diagram of the activation circuit of the preferred embodiment shown in FIG. 1.

Referring to FIGS. 1–3, a preferred embodiment of the present invention is shown as an automatic vehicle washer, generally designated 10. As shown most clearly in FIG. 1, the automatic vehicle washer 10 includes vehicle washing equipment 12, an electrical power source 14 for the vehicle washing equipment 12, and an activation circuit 16.

The activation circuit 16 is interconnected between the washing equipment 12 and power source 14, and includes an input circuit 18, comparison circuit 20, and energizing circuit 22.

The input circuit 18 includes an input device for a driver of a vehicle (not shown) to manually transmit a numerical input to the vehicle washer 10. While a variety of input devices could be used, the present invention uses a 12 button key pad 24 (FIG. 3A).

After receiving a manual input, the input circuit 18 responsively transmits a signal to the comparison circuit 20 (FIG. 1). The comparison circuit 20 determines whether the signal from the input circuit 18 coincides with a previously established code. If so, the correct code has been entered into the input circuit 18, and the comparison circuit 20 produces a run signal.

Any run signal so produced is received by the energizing circuit 22. Upon receiving such a signal, the energizing circuit 22 interconnects the power source 14 to the washing equipment 12, allowing it to operate.

The activation circuit 16 is shown in more detail in FIG. 2. In addition to the input and energizing circuits 18, 22, FIG. 2 shows the comparison circuit 20 as including a verification circuit 28 and an alarm circuit 30.

The verification circuit 28 is interconnected to the input circuit 18 and includes a code selection circuit 32 and correct entry counter circuit 34. The code selection circuit 32 receives a signal from the input circuit 18 each time that the driver makes a numerical input. If the signal coincides with a predetermined code stored within the code selection circuit 32, it transmits a signal to the correct entry counter circuit 34.

The correct entry counter circuit 34 keeps track of how many signals it receives from the code selection circuit 32. When the correct entry counter circuit 34 senses two sequential signals from the code selection circuit 32, it transmits a run signal to the washer energizing circuit 22 and alarm circuit 30.

Consequently, the washing equipment 12 (FIG. 1) receives power to operate. In addition, the alarm circuit 30 is inhibited from indicating that erroneous numerical inputs have been transmitted to the input circuit 18.

The alarm circuit 30 includes a total entry counter circuit 36, first and second delay circuits 38, 40, and timer circuit 42, as well as light and buzzer circuits 44, 46. All signals from the input circuit 18, whether or not correct, pass to the total entry counter circuit 36. As soon as two signals are received, the total entry counter circuit 36 transmits a first completion signal to the first delay circuit 38.

If no run signal is received by the first delay circuit 38 within approximately the next ½ second, the first delay circuit 38 transmits a signal to the light circuit 44, causing a red warning light (not shown) to turn on. Upon seeing the warning light, the driver will know that he has entered an improper code and should try again.

The transmission of a second improper two digit code will similarly activate the warning light circuit 44. If the driver then transmits additional (5th and 6th) numerical inputs that are improper, the total entry counter circuit 36 will produce a second completion signal, indicating that 6 numerical inputs have been made.

The second delay circuit 40 receives the second completion signal. Unless reset (deactivated) by a run signal from the correct entry circuit 34 within the next ½ second, the second delay circuit 40 will transmit a signal to both the light and buzzer circuits 44, 46. Consequently, both the red light will turn on and a buzzer (not shown) will sound. This will hopefully discourage the driver from "playing" with the key pad 24 until he learns the proper code.

The detailed schematic diagram of the activation circuit 16 is shown in FIG. 3. Notably, many components have been grouped together as part of a particular circuit. Such groupings have been made arbitrarily, however, and only for the purpose of making the description of the invention more straightforward and understandable.

1. Input Circuit 18

In the preferred embodiment, the input circuit 18 includes the key pad 24, a series of leads 48, an R-C filter network 50, a 12 volt power supply 52, a series of signal inverters 54, and six output leads 56, 58, 60, 62, and 66. The key pad 24 has twelve buttons, one for each of the digits 0–9, plus one for the plus symbol (+) and one for the negative symbol (−) 68, 70, 72, 74, 76, 78, 80, 82, 84, 86, 88, 90. While the key pad 24 resembles the face of a push button telephone, a variety of other types of input devices would function properly in the present invention.

The leads 48 of the input circuit 18 are interconnected, as shown to the R-C filter network 50, 12 volt power supply 52, and signal inverters 54. When interconnected as shown, the R-C filter network 50 prevents unwanted, spurious signals from being transmitted to the rest of the activation circuit 16.

The 12 volt power supply 52 is wired to the R-C Filter network 50 such that when one of the buttons 68–90 is depressed, the voltage at one of the leads 48 drops from 12 volts to nearly 0 volts. One of the signal inverters 54 senses such a decrease in voltage and, as explained below, supplies a positive signal to one or more of the output leads 56–66.

The positive signals resulting from depressing the buttons 70, 74, 76, 82, 84, 86, 90 (corresponding to the symbols 2, 4, 5, 8, 9, +, and −) cause a signal to be produced only at the one output lead 66. Signals resulting from depressing the buttons 68, 72, 78, 80, 88 (for the numerals 1, 3, 6, 7, and 0), however, cause a signal both at the output lead 66 and one of the other output leads 56–64.

Thus, the depression of any of the buttons 68–90 causes the transmission of a signal to the total entry counter circuit 36. In the preferred embodiment shown, entry counter circuit 36. In the preferred embodiment shown however, only five buttons 68, 72, 78, 80, 88 can cause a signal to be transmitted via the output leads 56–64, to the verification circuit 28. Of course, the input circuit 18 may be changed, without departing from the scope and spirit of the present invention, such that a different number of buttons can cause a signal to be transmitted to the verification circuit 28.

2. Verification Circuit 28

A. Code Selection Circuit 32

The verification circuit 28 includes the code selection circuit 32 and correct entry counter circuit 34. As shown in FIG. 3A, the code selection circuit 32 comprises first and second groups of five switches, respectively designated as 92 and 94, and first and second sets of five diodes, respectively designated as 96 and 98.

By closing one switch in each of the two groups of five switches 92, 94, an operator may select a two digit code. Thereafter, only signals from the key pad 24 which correspond to the preselected code will be acknowledged as correct by the activation circuit 16.

Thus, as an example, the switch corresponding to numeral 3 in the first set of switches 68 has been closed, and the switch corresponding to the numeral 7 in the second set of switches 70 has been closed. As a result, only depressing the button 72 (corresponding to the numeral 3) will initially cause a signal to be transmitted to the correct entry counter circuit 34. As will be explained in the following section, depressing other buttons will have no effect on the verification circuit 28. A pulse from the button 72, however, will pass on to the correct entry counter circuit 34.

Similarly, after the button 72 has been depressed, the activation circuit 16 will interconnect the vehicle washing equipment 12 and electrical power source 14 only if the button 80 (corresponding to the numeral 7) is then depressed. Other combinations of depressed buttons 68–90 will cause the warning light to turn on and/or the buzzer to sound.

B. Correct Entry Counter Circuit 34

The correct entry counter circuit 34 includes an input lead 100, binary counter 102 (such as the integrated circuit model No. 4520 manufactured by National Semiconductor, Inc.), four diodes 104, 106, 108, 110, two resistors 112, 114, and an output lead 116, interconnected as shown (FIG. 3B). The binary counter includes two input terminals 118, 120, two output terminals 122, 124, and a reset terminal 126.

For the example previously discussed, a first signal would be transmitted to the correct entry counter circuit 34, via the switches 92 and diodes 96, when the button 72 has been depressed. The signal is received by the input terminal 118 via the input lead 100.

When the button 72 is released, the signal stops. The voltage of the input terminal 118 decreases, and the binary counter 102 causes a positive signal to occur at the first output terminal 122. This positive signal is transmitted to the first input terminal 118 of the binary counter 102, via the diode 104. As a result, the input terminal 118 is kept at a positive voltage level. The output terminal 120, however, stays in a low voltage state, since it is effectively grounded via one of the diodes 98. As a result, positive voltage signals transmitted via the first set of switches and diodes 92 can have no effect on the binary counter 102.

In such a situation, the voltage applied to the second input terminal 120 of the binary counter 102 must rise before the second output terminal 124 increments in voltage. This only occurs, for the example given, when the button 80 corresponding to the numeral 7 is depressed and the output of one of the signal inverters 54 becomes high. As a result, the voltage of the second input terminal 120 is no longer held in a low state. Thus, the high voltage at the first output terminal 122 is transmitted, via the resistor 112 to the terminal 120.

When such an event occurs, the binary counter 102 causes the voltage at the second output terminal 124 to rise. This rise in voltage is referred to hereinafter as a run signal, signifying that two proper buttons have been pushed in the correct sequence.

The run signal is transmitted, via the diodes 108, 110, to the first and second input terminals of the binary counter 102, keeping them in a high voltage state. Thus, the binary counter is kept immune to the effects of further signals. The run signal is also transmitted, via the output lead 116, to the washer energizing circuit 22 (in order to interconnect the power source 14 with the washing equipment 12) and to the alarm circuit 30 (in order to prevent the warning light and/or buzzer from starting).

3. Washer Energizing Circuit 22

The washer energizing circuit 22 includes a buffer circuit 128, reset circuit 130, and instruction mechanism circuit 132 (FIGS. 3C–3D). The buffer circuit 128 includes a transistor 133 to receive the run signal, 12 volt power supply 14, photo-trac 135, power trac 136, varistor 137, 24 volt AC power supply 138, capacitor 140, and output lead 142, interconnected as shown in FIG. 3C.

Upon receiving a run signal, via the input lead 116 the transistor 133 turns on, drawing current from the 12 volt power supply 134. Consequently, the photo-trac 135 and power trac 136 turn on, and current flows from the 24 AC volt power supply 138 to the output lead 142.

The varistor 137 keeps the voltage across the power trac 136 from exceeding 45 volts and thus damaging it. Similarly, the capacitor 140 acts as a low resistance path if the voltage at the 24 volt AC source 138 should suddenly increase.

As shown in FIG. 3D, power from the 24 volt AC power supply 138 is transmitted to the washer equipment 12, via the output lead 142. When this occurs, a signal is supplied to the reset circuit 130.

The reset circuit 130 includes a varister 148, zener diode 150, transistor 152 (having a collector 154), 12 volt power supply 156, signal inverter 158, and reset lead 160, interconnected as shown in FIG. 3D. When current flows from the output lead 142 through the washer equipment 12, a voltage develops across the varister 148 and zener diode 150.

Consequently, the transistor 152 turns on, and the voltage at the collector 154 drops to near zero. This low voltage is converted to a high voltage signal by the signal inverter 158, which transmits the high voltage signal along the reset lead 160.

The reset lead 160 is interconnected to the reset terminal 126 of the binary counter 102 in the verification circuit 28, shown in FIG. 3A. Consequently, when the correct code is entered, the run signal passes, via the output lead 116, to the washer energizing circuit 22. Electrical power is then transmitted to the washing equipment 12. A high voltage signal is transmitted to the reset terminal 126 of the binary counter 102, and the verification circuit 28 is ready to receive a new code.

As shown in FIG. 3C, the instruction mechanism circuit 132 includes two 24 volt AC power supplies 162, 164, two normally closed relays 166, 168, a bay switch 170, armed line 172, and white and green lights 174, 176. The first and second relays 166, 168 each include a coil 178, 180 and switch 182, 184.

The switch 182 of the first relay 166 is normally closed; thus, the 24 volt AC power supply 162 normally provides power to illuminate the white light 174. The white light 174 instructs the driver to input the code on the key pad 24.

If a proper code is transmitted and a voltage develops across the varister 148, a signal is transmitted along the armed line 172, and the coil 178 becomes energized. Accordingly, the switch 182 opens, and the white light 174 is disconnected from the 24 volt AC power supply 162.

In addition, the signal from the armed line 172 passes through the normally closed switch 184 and energizes the green light 176. The green light 176 instructs the driver to move the vehicle into the entrance, or bay (not shown), of the vehicle washer 10. When the vehicle enters the correct position in the bay, the bay switch 170 closes, and the coil 180 is energized. As a result, the switch 184 opens, and the green light 176 is disconnected from the armed line 172.

4. Alarm Circuit 30

The alarm circuit 30 receives a signal each time that any button 68–90 is depressed. Unless it receives a run signal, it will initiate an alarm after any two of the buttons 68–90 have been depressed.

Also, if more than approximately 8–10 seconds elapses between the pressing of two buttons, the alarm circuit 30 will reset all circuits to put them in the same condition they would have been in if no buttons had been pushed.

This reset feature is desirable, since a driver must depress two buttons to enter the correct code. If the reset feature did not exist, one driver might depress only one button and leave the vicinity of the vehicle washer 10.

Unless the predetermined code was a set of identical digits, a second driver might then be unable to enter the correct code; the first number that he would input would be interpreted by the activation circuit 16 as an incorrect second digit, and the run signal would never be transmitted to the energizing circuit 22. With the present invention, however, this difficulty is eliminated, since all single digit entries are "forgotten" if not followed by a second digit input within approximately 8-10 seconds.

If the driver inputs one improper (two digit) code, a red warning light will turn on for about two seconds, letting the driver know he has made a mistake. The light will turn on again if the driver is unsuccessful a second time in manipulating the key pad 24 to enter a proper code. If the driver is unsuccessful yet a third time, a buzzer will sound for approximately ten seconds, and hopefully discourage the driver from again attempting to use the vehicle washer 10 until he learns the proper code.

The alarm circuit 30 provides means for achieving such effects. The alarm circuit 30 includes the total entry counter circuit 36, first and second delay circuits 38, 40, timing circuit 42, light circuit 44 and buzzer circuit 46.

A. Total Entry Counter Circuit 36

As shown in FIG. 3B, the total entry counter circuit 36 includes a binary counter 186, 12 volt power supply 188, timing capacitor 190, and signal inverter 191. The binary counter 186 may be of the same type of integrated circuit used in the correct entry counter circuit 34. It includes at least one input terminal 192, at least first, second and third output terminals 194, 196, 198, a disable terminal 200, and a reset terminal 202.

Each time that the input terminal 192 receives a signal from the output lead 66 of the input circuit 18, the output terminals 194-98 change voltage levels so as to count in a binary fashion. Accordingly, if one of the buttons 68-90 has been depressed and the input terminal 192 receives a pulse, the first output terminal 194 sends out a high voltage signal to the timing capacitor 190.

The high voltage charges the timing capacitor 190 such that, after about 8-10 seconds, the voltage across the timing capacitor 190 is sufficient to send a positive signal to the reset terminal 202 of the binary counter 186 and to the reset terminal 126 of the binary counter 102 in the verification circuit 28. Consequently, the signal from the output lead 66 is effectively "forgotten" by the activation circuit 16.

If another button is depressed within the 8-10 second time limit, however, the second output terminal 196 increases in voltage. Such an increase in the voltage at the second output terminal 196 shall be referred to as a completion signal, indicating that the driver has completed making two inputs with the key pad 24.

Notably, the pressing of a second button within the 8-10 second time limit also causes the voltage at the first output terminal 194 to decrease. The first output terminal 194 is interconnected to the signal inverter 191. Thus, the low voltage at the first output terminal 194 is transformed into a high voltage by the signal inverter 191 and transmitted to the first delay circuit 38.

B. First Delay Circuit 38

The first delay circuit 38 includes a delay flip flop 206 (such as the 4013 integrated circuit manufactured by National Semiconductor, Inc.) and an error lead 208. The delay flip flop includes an input terminal 210, first output terminal 212, inverted output terminal 214, and clear terminal 216.

The input terminal 210 receives all signals from the signal inverter 191, which indicate that the driver has pushed a button on the key pad 14 twice. During roughly the next ½ second, a run signal may appear along the output lead 116. If this occurs, the run signal is transmitted to the clear terminal 216 of the delay flip flop 206, and the alarm circuit 30 makes no further changes.

If no run signal appears along the output lead 116, however, the driver has pushed two buttons, at least one of which is improper. Thus, the output terminal 212 and the interconnected error lead 208 go to a high voltage state.

The high voltage along the error lead 208 is referred to hereafter as an error signal. The error signal is transmitted, along the error lead 208, to the light circuit 44. As a result, the red light will flash on and warn the driver that he has put in an improper code.

C. Light Circuit 44

The light circuit 44 includes a transistor 220 (having a collector 222), photo-trac 224, power trac 226, 24 volt AC power supply 228, varistor 230, capacitor 232, and red light 234, interconnected as shown in FIG. 3C. When a positive voltage appears along the error lead 208, the transistor 220 turns on and the voltage at the collector 222 drops to near zero.

The collector 222 is interconnected to the disable terminal 200 of the binary counter 186 of the total entry counter circuit 36 (FIG. 3B). Thus, when the error lead 208 transmits an error signal and the voltage of the collector 222 drops, the binary counter 186 is prevented from accepting any additional inputs from the key pad 24.

In addition, the collector 222 is interconnected to the photo-trac 224. When the voltage of the collector 222 drops, the photo-trac 224 turns on, causing the power trac 226 to turn on. Consequently, electric power flows from the 24 volt AC power supply 228 to the red light 234. The varister 230 and capacitor 232 prevent any spikes in the 24 volt AC power supply 228 from damaging the power trac 116.

D. Timer Circuit 42

The timer circuit 42 includes a binary counter 236 (such as the 4020 integrated manufactured by National Semiconductor, Inc.) a 60 hertz source 238, and a 12 volt power supply 240. In addition, FIG. 3B shows, as a matter of convenience, the timer circuit 42 as an including a 12 volt power supply 242 and signal inverter 244. The 12 volt power supply 242 and signal inverter 244 operate in conjunction with the correct entry counter circuit 34, total entry counter circuit 36 and first delay and second delay circuits 38, 40. The binary counters and delay flip flops in these circuits are reset (or "cleared") upon an initial application of power to the activation circuit 16.

The binary counter 236 includes an enable terminal 246, interconnected to the first and second delay circuits 38, 40, a clock input terminal 248, interconnected to the 60 hertz source 238, and at least fifth, seventh, eighth, and tenth binary output terminals 250, 252, 254, 256. The fifth, seventh and tenth binary output terminals 250, 252, 256 are interconnected to the 12 volt power supply 240 as shown in FIG. 3B. The eighth binary output terminal 254 is interconnected to the clear terminal 216 of the delay flip flop 206 in the first delay circuit 38.

Consequently, when the first output terminal 194 of the binary counter 186 in the total entry counter circuit 36 goes to a low voltage state (indicating that two, four, or six buttons have been pushed), the output terminal 212 of the delay flip flop 206 eventually goes to a high voltage. In addition, the inverted output terminal 214 eventually goes to a low voltage. The former change in voltage causes an error signal to be transmitted to the light circuit 44 while the latter change in voltage causes the binary counter 236 in the timer circuit 42 to be enabled.

Upon receiving a voltage pulse at the enable terminal 246, the binary counter 236 counts the number of 60 hertz pulses received via the clock input terminal 248. After 128 pulses (or about 2 seconds), the eighth binary output terminal 254 goes to a high voltage state. This voltage is transmitted to the clear terminal 216 of the delay flip flop 206.

Consequently, the output terminal 212 returns to a low voltage state. Thus, the error signal is stopped, and the red light 234 goes out. Moreover, the inverted output terminal 214 returns to a high voltage state. As a result, the enable terminal 246 is allowed to go to a high voltage state. The binary counter 236 is then disabled and reset.

If the driver incorrectly depresses two or more buttons, the first output terminal 194 of the binary counter 186 in the total entry counter 36 will again go to a low voltage. The delay flip flop 206 in the first delay circuit 38 will again wait for about ½ second and, if no run signal is received from the output lead 116, issue an error signal. The red light 234 will then stay lit for approximately two seconds, until the binary counter 236 in the timer circuit 42 counts 128 pulses and clears the delay flip flop 206.

E. Second Delay Circuit 40

The second delay circuit includes a delay flip flop 258 (having the same construction as the delay flip flop 206) and a second error lead 260. The delay flip flop 258 includes an input terminal 262, output terminal 264, inverted output terminal 266, and clear terminal 268.

The input terminal 262 is interconnected to both the second and third output leads 196, 198 of the binary counter 186 in the total entry counter circuit 36. The output terminal 264 is interconnected to the first and second error output leads 208, 260. The inverted output terminal 266 is interconnected to the enable terminal 246 of the binary counter 236 in the timer circuit 42.

Thus, when six buttons have been pushed, the second and third output terminals 196, 198 of the binary counter 186 in the total entry counter circuit 36 reach a high voltage state. This shall be referred to as a second completion signal. The issuance of the second completion signal causes the voltage at the input terminal 262 of the delay flip flop 258 in the second delay circuit 40 to go to a high state.

During approximately the next ½ second, a run signal may appear along the output lead 116 and at the clear terminal 268 of the delay flip flop 258. If this occurs, the alarm circuit 30 takes no further action.

If the run signal does not appear within the ½ second time limit, however, the driver has again made a mistake, and the activation circuit 16 will both ignite the red light 234 and sound the buzzer. To effect this, the output terminal 264 of the delay flip flop 258 goes to a high voltage state. Consequently, the voltage along the first error lead 208 goes to a high state, and the red light 234 ignites.

In addition, the output terminal 264 transmits a high voltage along the second error lead 260. This voltage is sensed by the buzzer circuit 46, which responsively causes the buzzer to ring. Also, the high voltage at the output terminal 264 causes the binary counter 186 in the total entry counter circuit 36 to be reset.

The inverted output terminal 266 drops to a voltage state near zero when the input terminal 262 receives a high voltage signal, causing the binary counter 236 in the timer circuit 42 to again start counting 60 hertz clock pulses. After 592 pulses (or roughly 10 seconds) the fifth, seventh, and tenth binary outputs 250, 252, 256 of the binary counter 236 all go to a high voltage state.

The 12 volt power supply 240 then delivers a high voltage to the clear terminal 268 of the second delay flip flop 258. Thereafter, the voltage at the first output terminal 264 drops to a low level, and the light 234 and buzzer goes off.

F. Buzzer Circuit 46

The buzzer circuit 46 includes a transistor 270 interconnected to the second error line 260, photo-trac 272, power trac 274, 24 volt AC power supply 276, varistor 278, voltage 280, and buzzer 282, interconnected as shown in FIG. 3C. The transistor 270 turns on and stays in this condition as long as it receives a signal along the second error line 260. This causes the photo-trac 272 and power trac 274 to turn on and allows the buzzer 282 to receive power from the 24 volt AC power supply 276. The varistor 278 and capacitor 280 protect the power trac 274 from voltage spikes occuring in the 115 volt AC power supply 276.

As may be seen from the foregoing description, the activation circuit 16 of the present invention is easy to fabricate. Most components, except, for example, the white, green, and red lights 174, 176, 234, buzzer 282, key pad 24, 24 volt AC power supplies 138, 162, 164, 228, 276, 12 volt power supplies 52, 134, 156, 188, 242, 60 hertz source 238, bay switch 170, and key pad 24 may be fabricated on a single printed circuit board.

While several different power sources are shown in the schematic of FIG. 3, the power sources may, of course, be derived from a single source of electrical power. In addition, the described embodiment uses CMOS integrated circuits such that the activation circuit 16 can operate with voltages that are higher than they would otherwise be. Such higher voltages make the activation circuit 16 less susceptible to malfunction because of spurious electrical noise. Notably, however, operable circuits may be constructed without using CMOS integrated circuits.

In addition, the key pad 24 may be mounted on a stand constructed as a free-standing unit. Alternatively, the key pad 24 may be mounted alongside of a standard coin box, such that the vehicle washing equipment 12 will operate if either money is deposited in the coin box or if a proper numerical code is transmitted to the key pad 24.

It is anticipated that an intercommunication system may be established between the key pad 24 and an off-location attendant. In this way, drivers experiencing difficulty with the activation circuit 16 may receive additional instructions.

Moreover, it is anticipated that the predetermined number stored in the code selection circuit 32 would be changed daily. In this way, a driver that learned the proper code on one day could not come back the following day and receive a free wash by transmitting the same code.

It is anticipated that such changes in the predetermined nunber may be effected quite easily. For example, the first and second sets of switches 92, 94 in the code selection circuit 32 may be positioned at a location remote from the rest of the activation circuit 16. Thus, the first and second sets of switches 92, 94 might be located such that the operator of the automatic vehicle washer 10 could change the proper code from his office.

Also, the activation circuit 16 might utilize two verification circuits and two washer energizing circuits. In this way, two different codes could be used to activate the vehicle washing equipment 12 int wo different manners. For example, the driver might transmit one two-digit code in order to have his vehicle washed in a normal fashion. Alternatively, the driver could transmit a different two-digit code in order to have his vehicle washed for a more extended period of time and thus have the vehicle cleaned more thoroughly.

A preferred embodiment of the present invention has been described herein. It is to be understood, however, that changes and modifications can be made without departing from the true scope and spirit of the present invention. The true scope and spirit are defined by the following claims and their equivalents, to be interpreted in light of the foregoing specification.

What is claimed is:

1. A vehicle washer comprising, in combination:
a vehicle washing apparatus;
an electrical power source;
input means for receiving a manual input and responsively providing an input signal;
verification means, interconnected to said input means, for storing a predetermined code, receiving said input signal, and producing a run signal when said predetermined code and input signal coincide;
activation means, interconnected to said verification means, for receiving said run signal and responsively interconnecting said electrical power source with said vehicle washing apparatus;
total entry counter means, interconnected to said input means, for receiving said input signal and issuing a first completion signal upon receiving said input signal;
delay means, interconnected to said total entry counter means, for receiving said first completion signal, counting for a predetermined period of time, and responsively issuing a first alarm signal during said predetermined period of time, said delay means further including inhibit means, interconnected to both said verification means and total entry counter means, for receiving said run and first completion signals and responsively providing a clear signal upon receiving both said first completion and run signals during said predetermined period of time; and
alarm means, interconnected to said delay means, for receiving said first alarm and clear signals and issuing an alarm upon receiving said first alarm signal.

2. The vehicle washer of claim 1 wherein said total entry counter means issues a second completion signal upon receiving a plurality of input signals;
said delay means includes a second delay counter for receiving said second completion signal, counting a second predetermined period of time, and responsively issuing a second alarm signal during said second predetermined period of time; and
said alarm means includes first and second warning alarms, said first warning alarm responsively providing a first alarm upon receiving said first alarm signal and said second warning alarm responsively providing a second alarm upon receiving said second alarm signal.

3. The vehicle washer of claim 2 wherein said first warning alarm comprises a light bulb and light energizing means, interconnected to said delay means, for energizing said light bulb upon receiving said alarm signal.

4. The vehicle washer of claim 3 wherein said second warning alarm comprises a buzzer and buzzer energizing means, interconnected to said delay means, for energizing said buzzer upon receiving said second alarm signal.

5. The vehicle washer of claim 4 wherein said total entry counter means includes an integrated circuit binary counter.

6. The vehicle washer of claim 4 wherein said delay means includes an integrated circuit delay flip flop.

*7. A vehicle washer comprising, in combination:*
*a vehicle washing apparatus;*
*an electrical power source;*
*input means for receiving a manual input and responsively providing an input signal;*
*verification means, interconnected to said input means, for storing a predetermined code, receiving said input signal, and producing a match signal when said predetermined code and input signal coincide;*
*activation means, interconnected to said verification means, for receiving said match signal and responsively interconnecting said electrical power source with said vehicle washing apparatus; and*
*completion means for sensing completion of said input signal and enabling said verification means.*

*8. A vehicle washer comprising, in combination:*
*a vehicle washing apparatus, said apparatus performing at least first and second types of vehicle conditioning operations;*
*an electrical power source;*
*control means for receiving at least first and second control signals, said control means enabling said washing apparatus to perform said first conditioning operation upon receiving said first control signal and said second conditioning operation upon receiving said second control signal;*
*input means for receiving a manual input and responsively providing an input signal;*
*verification means, interconnected to said input means, for storing at least first and second predetermined codes, for receiving said input signal and producing a match signal when said first predetermined code and input signal coincide, and for receiving said input signal and producing a second match signal when said second predetermined code and input signal coincide;*
*activation means, interconnected to said verification means and control means, for receiving said first match signal and responsively interconnecting said electrical power source with said vehicle washing apparatus and providing a first control signal to said control means, whereby said washing apparatus will perform said first conditioning operation, and for receiving said second match signal and responsively interconnecting said electrical power source with said vehicle washing apparatus and providing a second control signal to said control means, whereby said washing apparatus will perform said second conditioning operation; and*
*completion means for sensing completion of said input signal and enabling said verification means.*

* * * * *